July 10, 1928.　　　　　　　　　　　　　　　　1,677,019
P. CASATI ET AL
ARRANGEMENT FOR ELIMINATING THE DANGERS DUE TO BACK FIRES IN CARBURETORS
Filed Dec. 29, 1926

Inventors
Pietro Casati,
Alessandro Antoniola

Patented July 10, 1928.

1,677,019

UNITED STATES PATENT OFFICE.

PIETRO CASATI AND ALESSANDRO ANTONIOLA, OF TURIN, ITALY.

ARRANGEMENT FOR ELIMINATING THE DANGERS DUE TO BACK FIRES IN CARBURETORS.

Application filed December 29, 1926, Serial No. 157,783, and in Italy January 14, 1926.

This invention relates to an apparatus for obviating the danger due to back firing in internal combustion engines, and comprises a tubular body adapted to be inserted between the engine and the carburetor, and provided in its interior at one end with a safety valve opening towards the engine and at the other end with a plunger mounted on a rod on which it is maintained in a balanced position by means of springs acting on each side thereof and acting to close the safety valve when it is displaced by gas flowing from the engine. The plunger during the first part of its stroke moves in an enlarged part of the tubular body where it is guided by ribs and then in a part of said body in which it fits exactly. Between the plunger and the valve there are arranged relief valves in two parallel planes, those adjacent to the plunger being uncovered by this latter and those near the valve serving to discharge the gas between the plunger and the valve.

The adoption of this apparatus completely obviates any danger of the carburetor taking fire and the serious consequences deriving therefrom especially in aircraft.

The accompanying drawing shows by way of example and diagrammatically the object of our invention.

Figure 1:
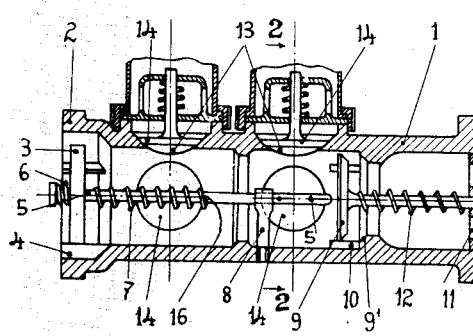
Figure 1 is an axial longitudinal section of a constructional form.
Figure 2:
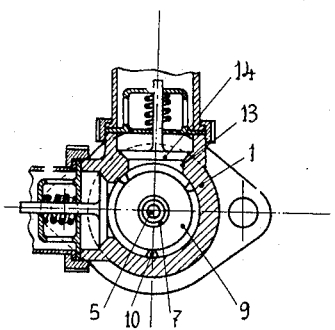
Figure 2 is a section on line 2—2 of Fig. 1.

1 denotes the tubular body of the apparatus having a cylindrical section. The end 2 which is of larger diameter than the body is to be connected to the engine, not shown, and contains a plunger 3 of the same diameter as the bore of the body 1. The plunger 3 guided by ribs 4 and traversed by a rod 5 is situated between two springs one of which 6, is held by a head 5' and the other spring 7 by a pin 16. The rod 5 is fitted at one end centrally into the plunger 3 and is guided at the other end by a small support 8. The extreme end of the rod 5 lies in proximity to the face of a coaxial conical throttling valve 9 which is of a smaller diameter than the body 1 in which it is guided by ribs 10 and a disc having large openings 11. The valve 9 is held raised from its seat 9' by a spring 12. Into the body 1 open ports forming the seats 13 of the automatic relief valves 14 arranged by pairs on the same circumference at 90° to each other in order to allow the free operation of the carburetor.

The apparatus works as follows: Suction normally takes place from the engine through the tubular body 1 and the mixture flows through the disc with large openings 11, the valve 9 (by way of the spaces between the ribs 10) and plunger 3 (by way of the space between ribs 4). In case of a back fire, the pressure of the gas leaving the engine acts upon the plunger 3 which compresses the spring 7 and this latter by means of the pin 16 moves the rod 5 the end of which presses the valve 9 onto its seat 9'. The carburetor is thus immediately disconnected from the space within the tubular body 1; meanwhile the plunger 3 uncovers in its further motion the series of relief valves 14 through which the flame is directed towards and quenched in the silencer or other suitable device.

The gas that is between the safety valve 9 and the plunger 3, and is compressed by this latter, is discharged through the relief valves 14 located nearest said valves.

The apparatus may be modified by extending the rod 5 up to the supporting disc 11 and substituting for the valve 9 and its stem a valve head slidably mounted on the rod 5 and subjected to the action of springs 7 and 12 so arranged that the valve head will be maintained, under normal conditions, raised from its seat 9'. In this modification, of course, the support 8 and the guiding ribs 10 are omitted.

What I claim is:

1. An apparatus of the character described, comprising a tubular body adapted to be inserted between an engine and a carburetor, a safety valve in one end of said body normally open towards said engine, a plunger in the other end of said body, a rod on which said plunger is movably mounted, and springs on said rod for holding the plunger in balanced position and operatively connected with the rod, whereby the latter is actuated to close the valve by the movement of the plunger.

2. An apparatus of the character described, comprising a tubular body for insertion between an engine and a carburetor and having an enlarged portion on one end provided with longitudinal guide ribs, a plunger of substantially the same diameter as said body normally seated on the guide ribs, a rod traversing the plunger extending into said body, a safety valve in the other end of said body, and springs on said rod for holding the plunger in balance position and operatively connected with the rod, whereby the latter is actuated to close the valve by the movement of the plunger.

3. An apparatus of the character described, comprising a tubular body adapted to be inserted between an engine and a carburetor, a safety valve in one end of said body normally open towards said engine, a plunger in the other end of said body, a rod on which said plunger is movably mounted, springs on said rod for holding the plunger in balanced position and operatively connected with the rod, whereby the latter is actuated to close the valve by the movement of the plunger, and discharge valves in said body between the plunger and valve arranged in parallel planes perpendicular to the axis of said body.

In testimony that we claim the foregoing as our invention, we have signed our names.

PIETRO CASATI.
ALESSANDRO ANTONIOLA.